US008898661B2

(12) United States Patent
Wang

(10) Patent No.: US 8,898,661 B2
(45) Date of Patent: Nov. 25, 2014

(54) SYSTEM AND METHOD FOR INSTALLING PROGRAM

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/418,369

(22) Filed: Mar. 13, 2012

(65) Prior Publication Data

US 2013/0167142 A1  Jun. 27, 2013

(30) Foreign Application Priority Data

Dec. 21, 2011 (CN) .......................... 2011 1 0432395

(51) Int. Cl.
*G06F 9/445* (2006.01)

(52) U.S. Cl.
USPC ........... 717/174; 717/175; 717/176; 717/177; 717/178; 709/201; 709/218

(58) Field of Classification Search
CPC .................................. G06F 9/445; G06F 8/60
See application file for complete search history.

(56) References Cited

U.S. PATENT DOCUMENTS

| 5,530,862 | A | * | 6/1996 | Wadsworth et al. ............... 713/1 |
| 5,638,513 | A | * | 6/1997 | Ananda .............................. 726/5 |
| 5,649,187 | A | * | 7/1997 | Hornbuckle ......................... 1/1 |
| 6,049,671 | A | * | 4/2000 | Slivka et al. ................... 717/173 |
| 6,438,750 | B1 | * | 8/2002 | Anderson ....................... 717/178 |
| 6,643,777 | B1 | * | 11/2003 | Chu ................................. 726/16 |
| 6,842,896 | B1 | * | 1/2005 | Redding et al. ................ 717/172 |
| 8,121,874 | B1 | * | 2/2012 | Guheen et al. ................. 705/7.11 |
| 8,516,132 | B2 | * | 8/2013 | Selgas et al. ................... 709/228 |
| 2003/0228912 | A1 | * | 12/2003 | Wells et al. ....................... 463/43 |
| 2004/0117628 | A1 | * | 6/2004 | Colvin ........................... 713/176 |
| 2005/0034116 | A1 | * | 2/2005 | Rodriguez et al. ............. 717/174 |
| 2006/0075397 | A1 | * | 4/2006 | Kasahara ....................... 717/170 |
| 2006/0248522 | A1 | * | 11/2006 | Lakshminarayanan et al. ............................. 717/174 |
| 2007/0094400 | A1 | * | 4/2007 | Childress et al. .............. 709/229 |
| 2007/0240154 | A1 | * | 10/2007 | Gerzymisch et al. .......... 717/174 |
| 2008/0036719 | A1 | * | 2/2008 | Shyu et al. ....................... 345/88 |
| 2009/0113414 | A1 | * | 4/2009 | Hamilton ....................... 717/173 |
| 2009/0254673 | A1 | * | 10/2009 | Philyaw et al. ............... 709/231 |
| 2009/0260004 | A1 | * | 10/2009 | Datta et al. .................... 717/175 |
| 2011/0078676 | A1 | * | 3/2011 | Sutherland et al. ........... 717/173 |

* cited by examiner

*Primary Examiner* — Chameli Das

(74) *Attorney, Agent, or Firm* — Novak Druce Connolly Bove + Quigg LLP

(57) ABSTRACT

A system capable of installing programs includes a plurality of personal computers (PCs) communicating with a network server. Each of the PCs includes a setup transmitting module, a host identification code replacing module, and a program installing module. The setup transmitting module downloads an installation package of a program from the network server to the PC. The installation package includes a linking relationship between an identification code of the program and a host identification code of a first PC which firstly installs the program thereinto, the linking relationship is used for determining if a PC is authorized to install the program thereinto. The host identification code replacing module obtain an identification code of the PC, and replaces the identification code of the PC with the identification code of the first PC, so as to enable the PC is authorized to install the program thereinto. A related method is also provided.

11 Claims, 6 Drawing Sheets

SYSTEM AND METHOD FOR INSTALLING PROGRAM

CROSS-REFERENCE TO RELATED APPLICATION

The present application claims priority to patent application Ser. No. 201110432395.9 filed on 2011 Dec. 21 in China, which is incorporated herein by reference.

BACKGROUND

1. Technical Field

The present disclosure relates to program installing and, particularly, to a system capable of installing program downloaded from a network server into a computer, and a method employed by the system.

2. Description of the Related Art

When a program is installed into a computing device such as a personal computer (PC), an identification code, such as a version number, of the program is banded to a host identification code, such as a main board serial number, of the computing device and the banded relationship of the identification code of the program and the host identification code of the computing device is recorded and stored in the program. When the program is installed to another computing device such as another PC, if the host identification code of the other computing device is different from the host identification code stored in the program, the program cannot be installed to the another computing device successfully, thus preventing the installation of the program to another computing device.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
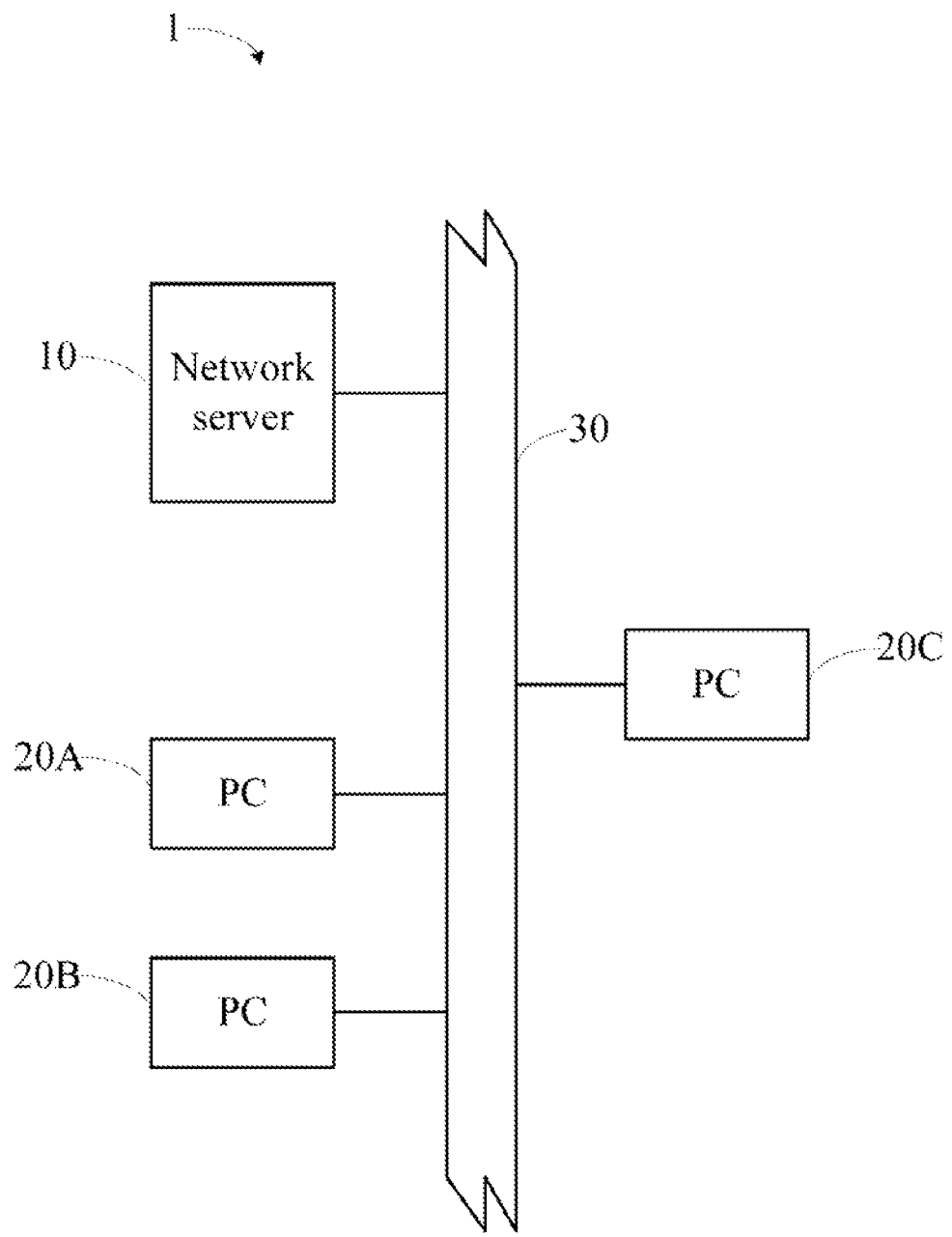
FIG. 1 is a schematic diagram of a system capable of installing programs including a network server communicating with a number of computing devices via network in accordance with an exemplary embodiment.

FIG. 1 is a schematic diagram of a program installing system. The system 1 includes a network server 10 and a number of personal computers (PCs). In the embodiment, three PCs labeled 20A, 20B and 20C are shown as examples for illustration. The network server 10 communicates with the PCs 20A-20C via a network 30. In the embodiment, the network server 10 is a cloud computing server.

Figure 2:
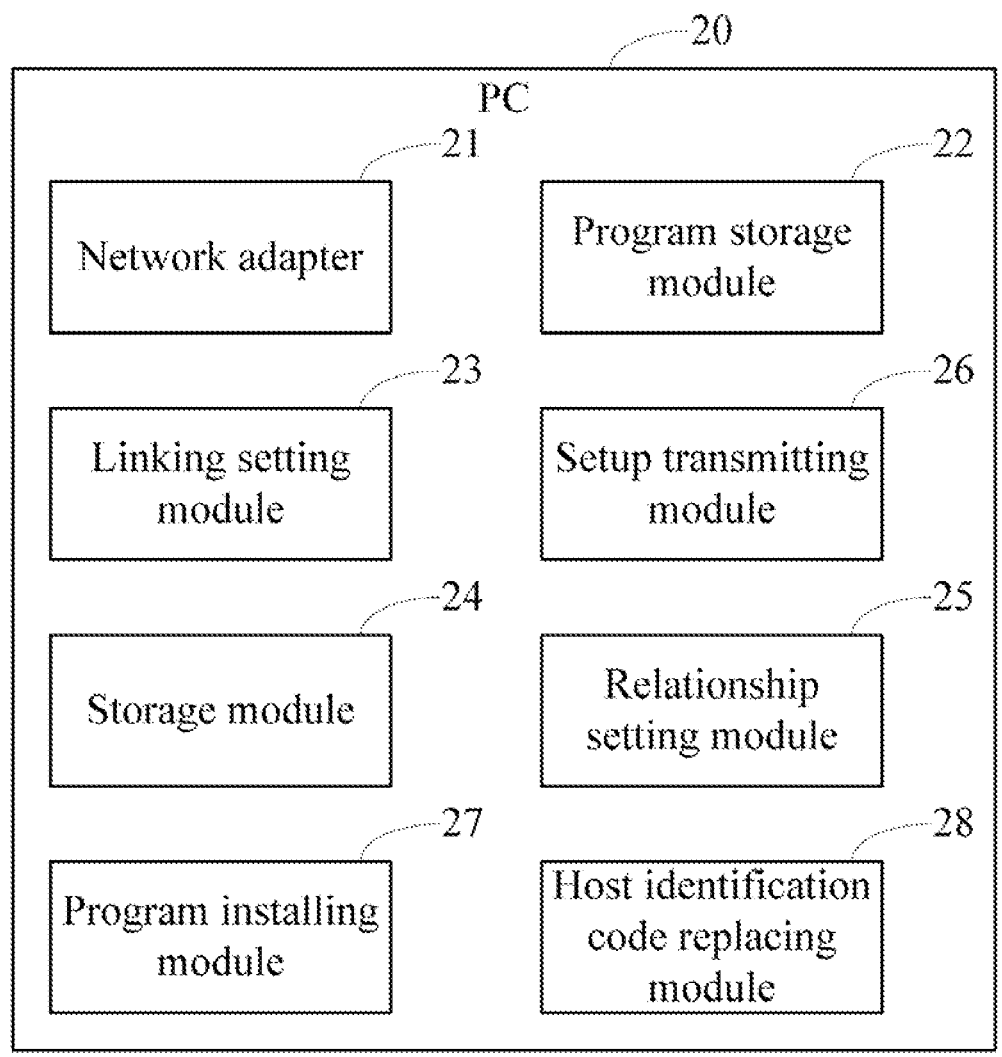
FIG. 2 is a block diagram of the computing device of FIG. 1 in accordance with an exemplary embodiment.

Referring to FIG. 2, the PCs 20A-20C each includes a network adapter 21 and a program storage module 22. The network adapter 21 is configured to communicate with the network 30. The program storage module 22 is configured to store various programs, each of which has an identification code to identify the program. The program storage module 22 can be storage unit built-in to each of the PCs 20A-20C, such as read only memory (ROM), or storage unit connected to each of the PCs 20A-20C, such as optical disk.

The PCs 20A-20C each further includes a linking setting module 23, a storage module 24, a relationship setting module 25, a setup transmitting module 26, and an installing module 27. When a program titled for example AA which is stored in the program storage module 22 is selected to be installed into one of the PCs 20A-20C such as the PC 20A, the linking setting module 23 of PC 20A obtains the identification code of the program AA and an identification code of the PC 20A, and establishes a first linking relationship between the identification code of the program AA and the identification code of the PC 20A. The storage module 24 of PC 20A stores the first linking relationship. The identification code of the program AA includes a version number and a serial number. The identification code of the PC 20A includes a main board serial number. The relationship setting module 25 is configured to preset a second relationship between user information and user authorization. The storage module 24 stores the second relationship. The user information includes user names registered in the PC 20A. The user authorization includes a preset authorization status of each registered user to install the program into the PC 20A. The user can be set to an authorized user who is permitted to install the program and unauthorized user who is not permitted to install the program. For example, the user with the user name of "user No. 1" may be preset to be an authorized user and the user with the user name of "user No. 2" may be preset to be unauthorized.

The setup transmitting module 26 of the PC 20A packages the first linking relationship and the second relationship into an installation package, and uploads the installation package to the network server 10 via the network 30.

Figure 3:
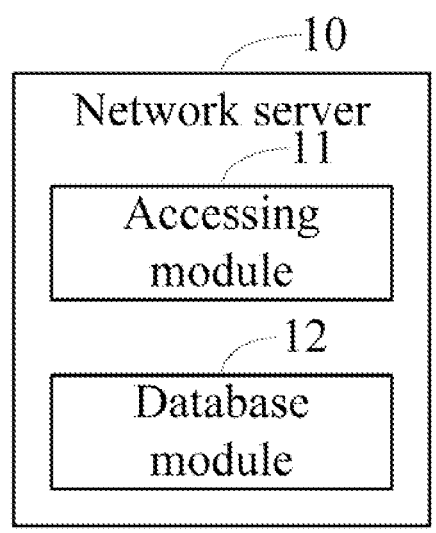
FIG. 3 is a block diagram of the network server of FIG. 1 in accordance with an exemplary embodiment.

Referring to FIG. 3, the network server 10 includes an accessing module 11 and a database module 12. The accessing module 11 is configured for communicating with the setup transmitting module 26 via the network 30. The database module 12 is configured to store the installation package uploaded by the setup transmitting module 26.

Figure 4:
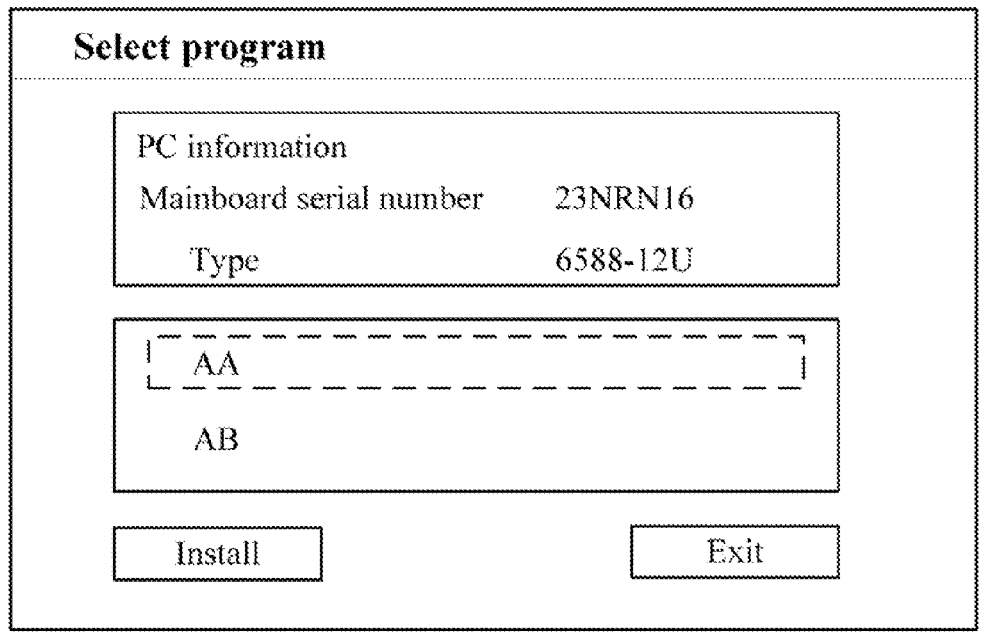
FIG. 4 is a schematic view showing a user interface provided by the computing device to display programs downloaded from the network server of FIG. 1, in accordance with an exemplary embodiment.

When installation package of the program AA stored in the server 10 is selected to be installed into another one of the PC 20A-20C, such as the PC 20B, the setup transmitting module 26 of the PC 20B downloads the installation package of the program AA to the PC 20B via the network 30. FIG. 4 illustrates the download and installation of the installation package of the program AA to the PC 20B.

Referring to FIG. 4, in the embodiment, the PC 20B communicates with the server 10 and provides a user interface to display the installation packages such as installation packages AA and AB previously stored in the database module 12 for users to select. When the program AA is selected to be installed into the PC 20B, the setup transmitting module 26 of the PC 20B downloads the installation package of the program AA. The relationship setting module 25 determines the user authorization for installing the program AA according to the user information of the user of the PC 20B and the second relationship in the installation package. Each of the PCs 20A-20C further includes a host identification code replacing module 28. When the user is determined to be an authorized user, the host identification code replacing module 28 of the PC 20B obtains the host identification code of the PC 20B and the host identification code of the first linking relationship stored in the installation package, and replaces the host identification code in the first linking relationship place with the host identification code of the PC 20B, so as to enable the PC 20B is authorized to install the program AA thereinto. The program installing module 27 installs the program AA into the PC 20B.

In an alternative embodiment, the setup transmitting module 26 generates the installation package of the program AA to make a packet of the first linking relationship, the second relationship, and the setup of the program AA. The setup transmitting module 26 of the PC 20B downloads the installation package from the database module 12 via the network 30 to the PC 20B. The installing module 27 of the PC 20B directly installs the program AA in the installation package into the PC 20B.

Figure 5:
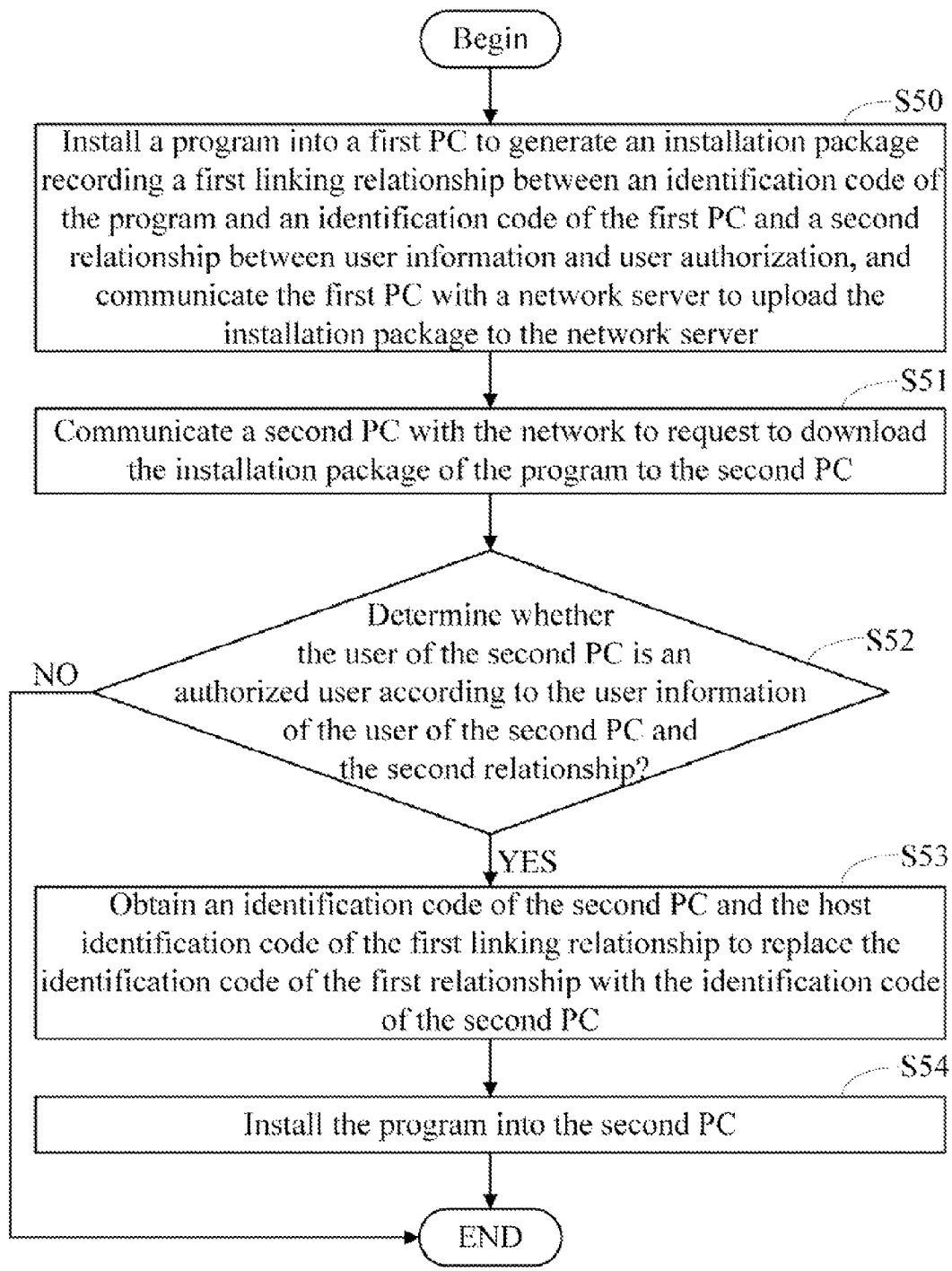
FIG. 5 is a flowchart illustrating a method of installing a program applied in the computing device of FIG. 2, in accordance with an exemplary embodiment.

FIG. 5 a flowchart illustrating a method of installing program applied in the PC.

In step S50, the program AA is selected to be installed into the PC 20A, after the installation, an installation package of the program AA is also generated, the installation package of the program AA records a first linking relationship between the identification code of the program AA and the identification code of the PC 20A, and a second relationship between the user information and the user authorization. The setup transmitting module 26 of PC 20A uploads the installation package to the network server 10 via the network 30, and the network server 10 stores the uploaded installation package in the database module 12.

In step S51, the setup transmitting module 26 of the PC 20B communicates with the network server 10 to request to download the installation package of the program AA to the PC 20B via the network 30.

In the embodiment, the PC 20B communicates with the network server 10 and provides a user interface for displaying installation packages of the programs stored in the database module 12 for users to select and transmit the request to download the installation package of the program AA selected.

In step S52, the relationship setting module 25 determines whether the user of the PC 20B is an authorized user, according to the user information of the user of the PC 20B and the second relationship in the installation package. If yes, the procedure goes to step S53, otherwise, the procedure ends.

In step S53, the host identification code replacing module 28 obtains the host identification code of the PC 20B and the host identification code of the first linking relationship stored in the installation package, and replaces the host identification code with the host identification code of the PC 20B.

In step S54, the program installing module 27 installs the program AA into the PC 20B.

Figure 6:
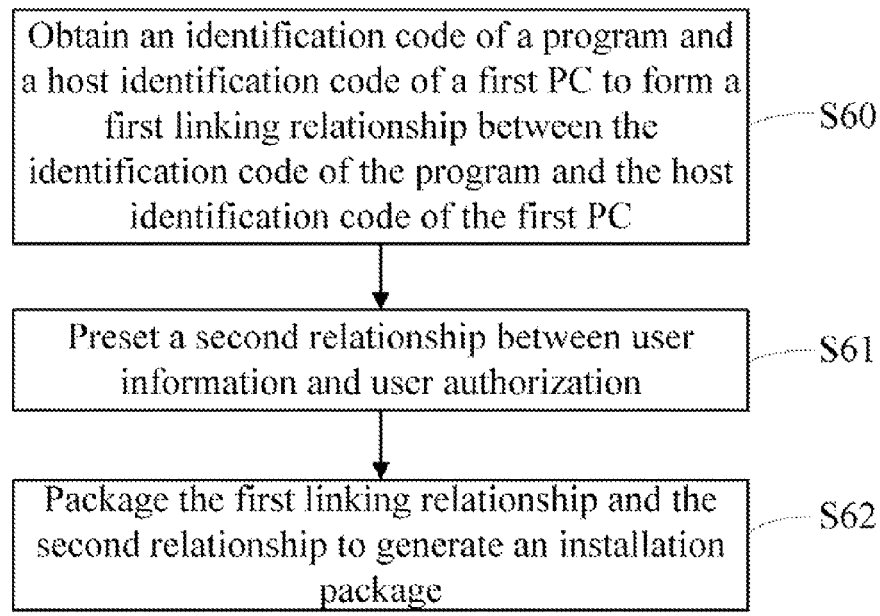
FIG. 6 is a flowchart illustrating a method of generating an installation package applied in the computing device of FIG. 2, in accordance with an exemplary embodiment.

FIG. 6 is a flowchart illustrating a method of generating the installation package applied in the PC 20A.

In step S60, when a program AA stored in the program storage module 22 is selected to be installed into the PC 20A, the linking setting module 23 obtains the identification code of the program AA and the host identification code of the PC 20A, and forms the first linking relationship between the identification code of the program AA and the identification code of the PC 20A. The storage module 24 stores the first linking relationship.

The identification code of the program AA includes a version number and a serial number thereof. The identification code of the PC 20A includes the main board serial number.

In step S61, the relationship setting module 25 presets the second relationship between user information and user authorization. The storage module 24 stores the second relationship.

The user information includes user names registered in the PC 20A. The user authorization is preset for each registered user to set authorization for installing the program to the PC 20A. The user can be set to an authorized user who is permitted to install the program and a person who is unauthorized. For example, the user with the user name of "user No. 1" may be preset to an authorized user and the user with the user name of "user No. 2" may be preset as unauthorized.

In step S62, the setup transmitting module 26 packages the first linking relationship and the second relationship to generate an installation package.

In an alternative embodiment, the setup transmitting module 26 generates the installation package of the program AA into a packet with the first linking relationship, the second relationship, and the setup of the program AA. The setup transmitting module 26 of the PC 20B downloads the installation package from the database module 12 via the network 30 to the PC 20B. The installing module 27 of the PC 20B directly installs the program AA in the installation package into the PC 20B.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A system capable of installing program comprising:
a plurality of personal computers (PCs) for communicating with a network server, wherein each of the PCs comprises:
a program storage module configured to store setups of various programs, each of which has an identification code associated therewith;
a linking setting module configured to obtain the identification code of a program and an identification code of a PC which firstly installs the program among the PCs, and establish a first linking relationship between the identification code of the program and the identification code of the PC, the first linking relationship configured for determining if a PC of the PCs is authorized to install the program thereinto;
a relationship setting module configured to preset a second relationship between user information and user authorization for installing the program;
a storage module configured to store the first linking relationship and the second relationship;
a setup transmitting module configured to package the first linking relationship and the second relationship into an installation package including a relationship between user information and user authorization, and upload the installation package to the network server via the network, wherein the setup transmitting module being comprised in the PC which firstly installs the program among the PCs, or in any other PC of the PCs; and
a relationship setting module configured to determine a user's authorization status for installing the program into the PC according to the user information of the user of the PC and the second relationship in the installation package, the program installing module installs the program into the PC when the user is determined to be an authorized user.

2. The system capable of installing program as recited in claim 1, wherein the identification code of the program comprises a version number and a serial number.

3. The system capable of installing program as recited in claim 1, wherein the identification code of the PC comprises a main board serial number.

4. The system capable of installing program as recited in claim 1, wherein the user information comprises a number of user names registered in the PC, and the user authorization includes a preset authorization status of each registered user to install the program.

5. A system capable of installing a program, comprising:

a plurality of personal computers (PCs) for communicating with a network server, the network server storing an installation package of a program, the installation package including a relationship between user information and user authorization, the installation package comprising a linking relationship between an identification code of the program and a host identification code of a first one of the PCs which firstly installs the program among the PCs, the linking relationship configured for determining if a PC is authorized to install the program thereinto, the PC comprising:

a setup transmitting module configured to download the installation package of the program from the network server to the PC;

a host identification code replacing module configured to obtain an identification code of the PC, and replace the identification code of the PC with the identification code of the first one of the PCs which firstly installs the program among the PCs, so as to enable the PC is authorized to install the program thereinto; and a program installing module configured to install the program of the installation package into the PC; and a relationship setting module configured to determine a user's authorization status for installing the program into the PC according to the user information of the user of the PC and the second relationship in the installation package, the program installing module installs the program into the PC when the user is determined to be an authorized user.

6. The system capable of installing program as recited in claim 5, wherein the identification code of the program comprises a version number and a serial number.

7. The system capable of installing program as recited in claim 5, wherein the identification code of the PC comprises a main board serial number.

8. The system capable of installing program as recited in claim 5, wherein the user information comprises a number of user names registered in the PC, and the user authorization includes a preset authorization status of each registered user to install the program.

9. A method of installing program applied in a system capable of installing a program, wherein the system comprises a first PC and a second PC communicating with a network server, the method comprising:

downloading an installation package from the network server to the second PC, the installation package having been uploaded by the first PC, the installation package comprising a first linking relationship between an identification code of the program and a host identification code of the first PC, which firstly installs the program among the PCs, and a second relationship between user information and user authorization;

determining whether the user of the second PC is an authorized user to install the installation package of the program into the second PC according to the user information of the user of the second PC and the second relationship in the installation package;

obtaining the host identification code of the second PC and replacing the host identification code of the second PC with that host identification code of the first PC if the user of the second PC is determined to be an authorized user; and installing the program into the second PC.

10. The method as recited in claim 9, wherein the identification code of the program comprises a version number and a serial number, the host identification code of each of the first PC and the second PC comprises a main board serial number.

11. The method as recited in claim 9, wherein the user information comprises a number of user names registered in the first PC and the second PC, and the user authorization includes a preset authorization status of each registered user to install the program.

* * * * *